United States Patent [19]
Moodie et al.

[11] Patent Number: 6,008,926
[45] Date of Patent: Dec. 28, 1999

[54] DISCRETE ELECTROABSORPTION MODULATOR

[75] Inventors: David Graham Moodie; Michael John Harlow, both of Ipswich, United Kingdom

[73] Assignee: British Telecommunications public limited company, London, United Kingdom

[21] Appl. No.: 09/029,901

[22] PCT Filed: Feb. 21, 1997

[86] PCT No.: PCT/GB97/00505

§ 371 Date: Mar. 11, 1998

§ 102(e) Date: Mar. 11, 1998

[87] PCT Pub. No.: WO97/36204

PCT Pub. Date: Oct. 2, 1997

[30] Foreign Application Priority Data

Mar. 27, 1996 [EP] European Pat. Off. ............... 96302114
Mar. 27, 1996 [GB] United Kingdom ................... 9606420

[51] Int. Cl.$^6$ .................................................. G02B 26/00
[52] U.S. Cl. ......................... 359/238; 359/245; 359/248; 385/2; 385/8; 372/43; 372/50
[58] Field of Search .................................... 359/238, 245, 359/246, 248, 320, 321; 385/2, 4, 8, 9; 372/43, 45, 46, 50

[56] References Cited

U.S. PATENT DOCUMENTS

| | | | |
|---|---|---|---|
| 5,165,105 | 11/1992 | Haase et al. ................................ | 385/8 |
| 5,359,679 | 10/1994 | Tanaka et al. .............................. | 385/8 |
| 5,625,636 | 4/1997 | Bryan et al. ............................... | 372/50 |
| 5,659,565 | 8/1997 | Kitamura ................................... | 372/43 |
| 5,784,188 | 7/1998 | Nakamura et al. ....................... | 359/248 |

FOREIGN PATENT DOCUMENTS

| | | |
|---|---|---|
| 0437836 A2 | 7/1991 | European Pat. Off. . |
| 437 836 | 7/1991 | European Pat. Off. . |

OTHER PUBLICATIONS

Electronics Letters, Oct. 10, 1991, UK, vol. 27, No. 21, Devaux et al, "High–speed InGaAsP/InP multiple quantum well".

Journal of Lightwave Technology, Sep. 1996, IEEE, USA, vol. 14, No. 9, Moodie et al, "Discrete electroabsorption modulators with enhanced modulation depth".

Morito et al, "High Power Modulator Integrated DFB Laser Incorporating Strain–Compensated/MQW and Graded SCH Modulator for 10Gbit/s Transmission", Electronics Letters, 8$^{th}$ Jun. 1995, vol. 31, No. 12, pp. 975–976.

Guy et al, "Low repetition Rate Master Source for Optical Processing in Ultrahigh–Speed OTDM Networks", ELectronics Letters, 28$^{th}$ Sep. 1995, vol. 31, No. 20, pp. 1767–1769.

Ellis et al, "40 Gbit/s Transmission Over 202 km of Standard Fibre Using Midspan Spectral Inversion", Electronics Letters, 16$^{th}$ Feb. 1995, vol. 31, No. 4, pp. 299–301.

(List continued on next page.)

*Primary Examiner*—Loha Ben
*Attorney, Agent, or Firm*—Nixon & Vanderhye P.C.

[57] ABSTRACT

A discrete electroabsorption modulator for optical signals has an electrical blocking region (12a, 12b) which is large as compared with the absorber region (13). The height of the blocking region (12a, 12b) is 3–20 μm, e.g. 4–6 μm and preferably about 5 μm. In addition, the blocking region (12a, 12b) is 2–250 times, e.g. 15–25 times the height of the absorber region (13). The modulation depth is substantially increased, e.g. to values above 40 dB, by a thick electrical blocking region. It is believed that the thick blocking layer (12a, 12b) works because parasitic signals which escape into the blocking region are spatially removed from the vicinity of the absorber region; thus they are not acquired at the output.

20 Claims, 3 Drawing Sheets

OTHER PUBLICATIONS

Moodie et al, "Generation of 6.3ps Optical Pulses at a 10GHz Repetition Rate Using a Packaged Electroabsorption Modulator and Dispersion Compensating Fibre",Electronics Letters, 29$^{th}$ Sep. 1994, vol. 30, No. 20, pp. 1700–1701.

Devaux et al, "Experimental Optimisation of MQW Electroabsorption Modulators with Up to 40 GHz Bandwidths", Electronics Letters, 4$^{th}$ Aug. 1994, vol. 30, No. 16, pp. 1347–1348.

Koren et al, "Low–Loss InGaAs/InP Multiple Quantum Well Optical Electroabsorption Waveguide Modulator", Appl. Phys. Lett. 51(15), Oct. 12, 1987, pp. 1132–1134.

Tanaka et al, "5–Gb/s Performance of Integrated Light Source Consisting of λ/4–Shifted DFB Laser and EA Modulator with SI InP BH Structure", Journal of Lightwave Technology, vol. 8, No. 9, Sep. 1990, pp. 1357–1362.

Moodie et al, "Multiquantum Well Electroabsorption Modulators for 80 Gbit/s OTDM Systems", Electronics Letters, 3$^{rd}$ Aug. 1995, vol. 31, No. 16, pp. 1370–1371.

Moodie et al, "Discrete Electroabsorption Modulators with Enhanced Modulation Depth", Journal of Lightwave Technology, vol. 14, No. 9, Sep. 1996, pp. 2035–2043.

Devaux et al, "High–Speed, InGaAsP/InP Multiple Quantum Well, 1.55μm Singlemode Modulator", Electronics Letters, 27 (1991) Oct. 10, No. 21, Stevenage, Herts., GB, pp. 1926–1927.

DISCRETE ELECTROABSORPTION MODULATOR

This invention relates to an optical modulator, and more particularly to a discrete modulator which modulates optical signals by electroabsorption.

Electroabsorption modulators (EAM) provide a convenient way of modulating optical signals, e.g. at wave lengths of 1300 nm and 1500 nm, in a wide range of fibre optical systems. Using sinusoidal voltage control for modulation they can generate short, e.g. having a duration of less than 10 ps, pulses. EAM are not only used to apply information carrying signals to unmodulated optical signals but they are also used for the rapid switching of optical signals, e.g. for demultiplexing of optical time division multiplexed signals.

It is important to distinguish between two forms of EAM, namely discrete and laser integrated EAM. A laser integrated EAM is a single device, grown as a single entity on the same chip, which includes a signal source (laser) and an EAM. The two functions are arranged so that the EAM modulates the signal produced by the source. In a discrete EAM the modulator is separate from the signal source, e.g. the signal is provided by fibre. It will be apparent that integrated EAM cannot be used for applications where the signal source must be separate, e.g. for demultiplexing or other applications where the signal comes from a remote source. Tanaka et al in the Journal of Lightwave Technology, volume 4, number 9 of September 1990 pages 1357–1362 describe integral EAM which include a thick layer of Fe-doped InP to provide electrical separation between the two functions of single chip. Koren et al in Appl. Phys Letters Vol 51, No. 15 dated Oct. 12, 1987 pages 1123 and 1124 describe discrete EAM with a large (4 μm high and 6 μm wide) absorber region which is therefore multimode with a low modulation depth with a slow switching speed.

It is emphasised that a discrete EAM is not integrated with the primary signal source but it may be associated or integrated with other devices.

EAM are semiconductor devices and they are usually implemented in III/V materials, for example materials containing at least one of indium, gallium or aluminum together with at least one of phosphorus and arsenic. Some EAM are buried heterostructure devices having a mesa or a ridge, usually formed of n-type material (such as n-doped indium phosphide), which extends into an electrical blocking region such as iron doped indium phosphide. There is an absorber region blocking region such as iron doped indium phosphide. There is an absorber region located on top of the mesa and this region provides a path for the optical signals to be modulated. In order to provide the guidance the absorber region has a higher refractive index than the material surrounding it. It will be appreciated that a waveguide comprises a path of higher refractive index surrounded by a cladding of lower refractive index. Thus the absorber region and its surroundings constitute a waveguiding structure. To achieve high modulation deaths it is appropriate that the absorber region support only a single optical mode. It there is more than one mode, i.e. if there are parasitic modes, then these will be transmitted in the surrounding material. In other words, if there are more than one modes only one (the principle mode) mode is transmitted in the absorber region.

The absorber region is located between the top of the mesa and a cap region, e.g. a cap region formed of p-doped indium phosphide. As is usual, a semiconductor device comprises a p-doped region and an n-doped region. The absorber region is located between these two regions. For example, the absorber region is often located in the depletion region of a pin-junction which is reverse biased. The absorber region may take the form of a single layer of semiconductor material with a uniform chemical composition having a suitable band gap. Preferably, it takes the form of a multi quantum well (MQW) system which consists of many, e.g. 19 to 49, interleaved layers of different semiconductor materials. For example the MQW may consist of n layers (usually called "wells") of a first material and (n−1) layers (usually called "quantum barrier layers") of a second material wherein n is 10 to 25. [There are a total of (2n−1) layers.] The "wells" have a narrower band gap than the "barriers".

Quaternary semiconductors are particularly suitable for the absorber region (single layer or MQW) because variations of the ratios of the (four) constituents enable the band gap to be controlled as needed without adversely affecting the other (crystallographic and electrical) properties. In III/V systems, the quaternary compounds contain indium, gallium, phosphorus and arsenic.

EAM work because the optical signals travel in the absorber region and the absorption properties of this region are changed by the switching of an electric field applied across the region. As mentioned above, the absorber region is reverse biased during use and this means that little or no electric current flows. Nevertheless, an electric field can be switched on or off and it is the field which affects the absorption properties of the region. The chances are fast enough to make possible the high switching rates mentioned above. This is particularly true of the quaternary semiconductors mentioned above. The absorber region of an EAM has an "on" state in which attenuation should be low (ideally none but this ideal cannot be achieved in practice) and an "off" state when transmission should be low ideally none but, in practice there is always leakage). The ratio between the two states, measured in decibels, is called the "modulation depth" and it is an object of this invention to enable higher modulation depths to be achieved.

Unexpectedly, it has now been found that the size of the electrical blocking region has a substantial effect upon the modulation depth and that good modulation depths, e.g. in excess of 40 dB, can be obtained in reproducible devices when the blocking region is large enough as compared with the absorber region. Preferably, the blocking region is 9–250 times, more preferably 10–50 times and especially 15–25 times the thickness of the absorber region. The thickness of the electrical blocking region is usually important and the thickness should be 3–20 μm, e.g. 4–6 μm, preferably about 5 μm. As mentioned above, the absorber region is preferably monomode, i.e. it is small enough to support only one principle transmission mode and the following dimensions are particularly suitable; e.g. 2 μm wide by 1 μm thick, preferably 500–1000 nm wide and 100–500 nm thick.

The large electrical blocking regions confer extra advantages, e.g. improved electrical capacitance which is important for operating at high rates of modulation.

The invention, which is more fully defined in the claims, includes EAM with large electrical blocking regions as described above, EAM operationally connected for use, e.g. linked to optical fibres and provided with electrical control and also methods of modulating and demultiplexing using EAM with the thick electrical blocking regions. For the demultiplexing of optical signals, the electrical control selects the desired channels and rejects the others.

The invention wilt now be described by way of example with reference to the accompanying drawings in which.

Figure 1:
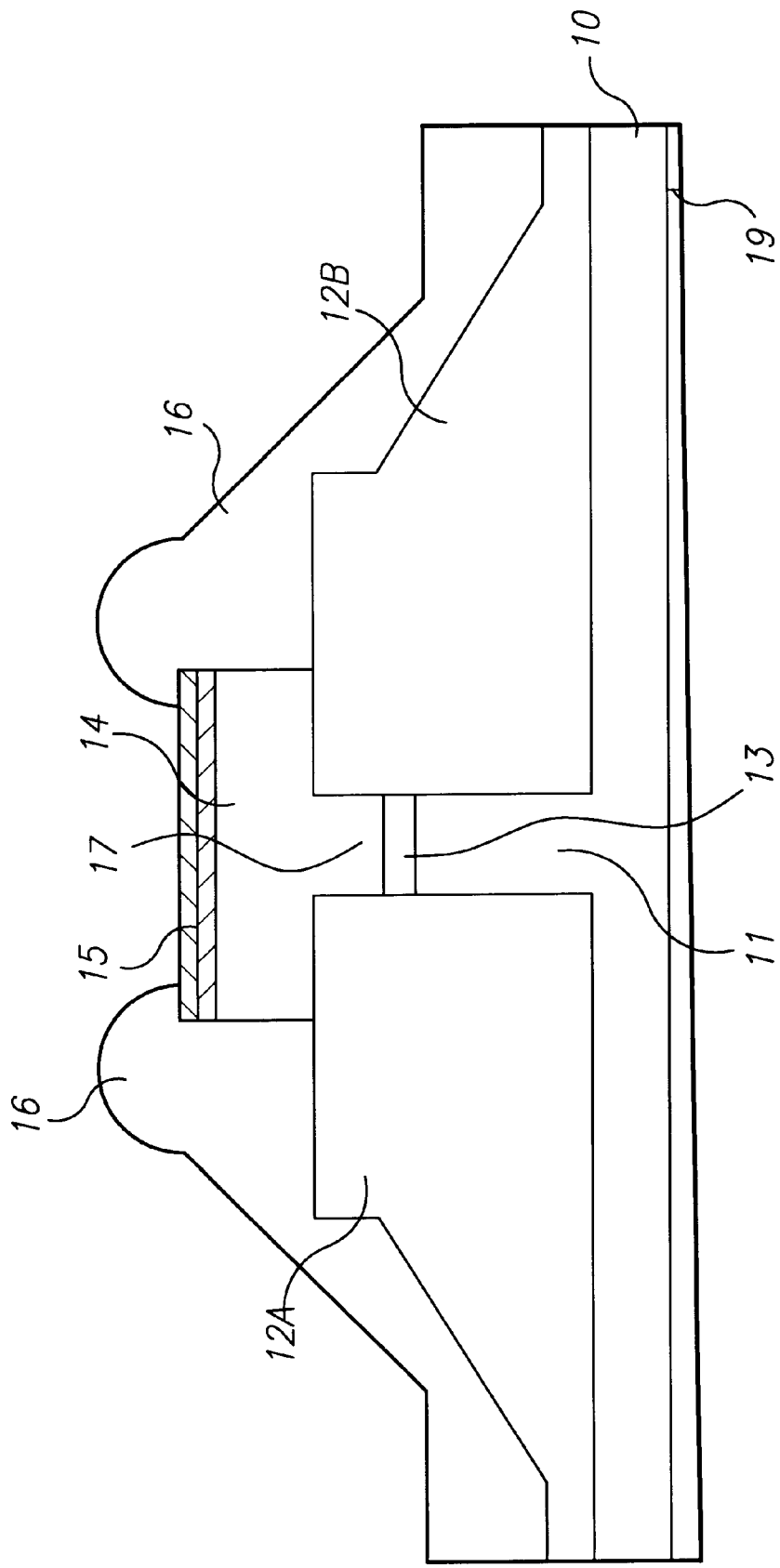
FIG. 1 is a transverse cross section through a device according to the invention
Figure 2:
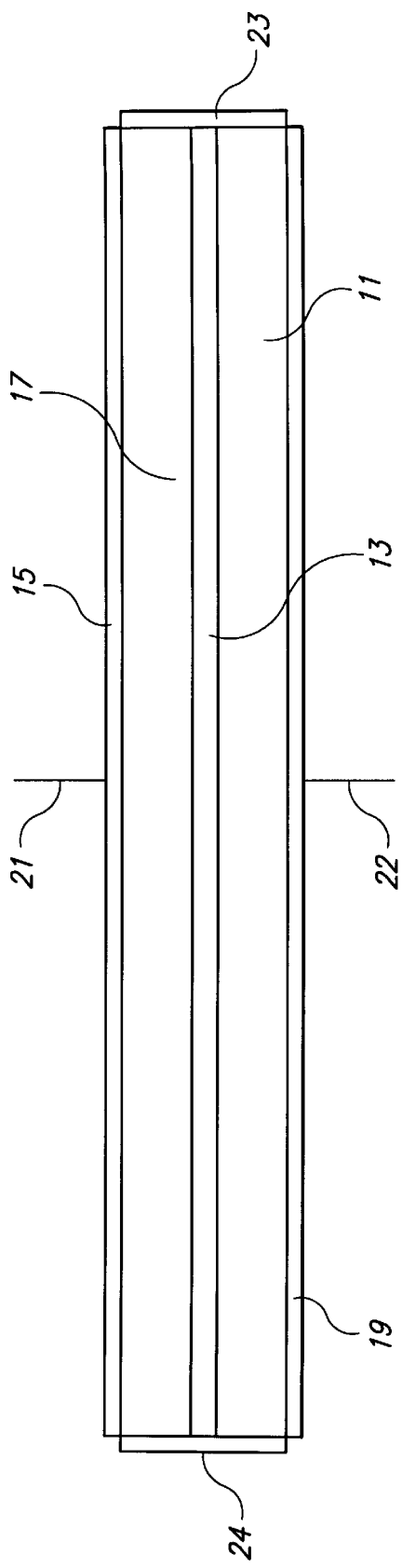
FIG. 2 is a longitudinal cross section though the device shown in FIG. 1

As shown in FIGS. 1 and 2, a discrete EAM comprises a base layer 10 having metalisation 19 and a connector 22 for making an external electrical contact. The base layer 10 is formed of n-InP with a mesa 11 which is 1200 nm wide and 4200 nm high. An absorber region 13 is located on top of the mesa 11. It is 260 nm thick and 800 nm wide and these dimensions mean that it is monomode (i.e. only one principle mode is supported). It has a multiquantum well (MQW) structure formed of two different quaternary semiconductors having the elements In, Ga, P and As in different proportions, There is a total of thirty one layers, namely seventeen wells and sixteen barrier layers. The absorber region 13 has a higher refractive index than its surroundings and, as can more easily be seen in FIG. 2, it constitutes a path to guide optical signals from one end of the device to the other. The length of the path is 400 μm and it has anti-reflection coatings 23 and 24 on its two facets.

The absorber region 13 is covered with a cap 14 of p-InP. The cap 14 is 6500 nm wide and 2900 nm thick with a downwardly extending projection 17 which is 500 nm long and 1200 nm wide. The projection 17 forms an interface with the MQW 13. The cap 14 has external electrical contacts 15 comprising a ternary layer of p-doped InGaAs and metalisation Ti/Au and a wire connector 21 is attached to the Ti/Au.

The device includes an electrical blocking region 12a, 12b which is 5000 nm thick. It has a high resistance and it is formed of InP doped with Fe. The electrical blocking region 12a, 12b is separated into two portions 12a and 12b by the mesa 11, the MQW 13 and the projection 17. It is possible to make the projection 17 longer than 500 nm with a lower mesa to compensate. For example, if the projection 17 is increased to 2500 nm then the mesa should be reduced to 2240 nm if it is desired to keep the thickness of the MQW 13 at 260 nm and the thickness of the electrical blocking layer 12 at 5000 nm. In any case, the height of the electrical blocking region 12 is substantially equal to the sum of the heights of these three items 11, 13 and 17.

The thickness of the electrical blocking region 12 is a most important feature of the invention and the absorber region 13 is in contact with the electrical blocking region 12. In fact the absorber region 13 is between and in contact with both portions 12a and 12b of the blocking region. It should also be noted that with the absorber region 260 nm thick and the electrical blocking layer 5000 nm thick, the electrical blocking region 12 is nearly 20 (19.23) times thicker than the absorber region The electrical blocking region 12 is covered, on both sides, with a layer 16 of As doped glass to reduce the capacitance of the device.

Figure 3:
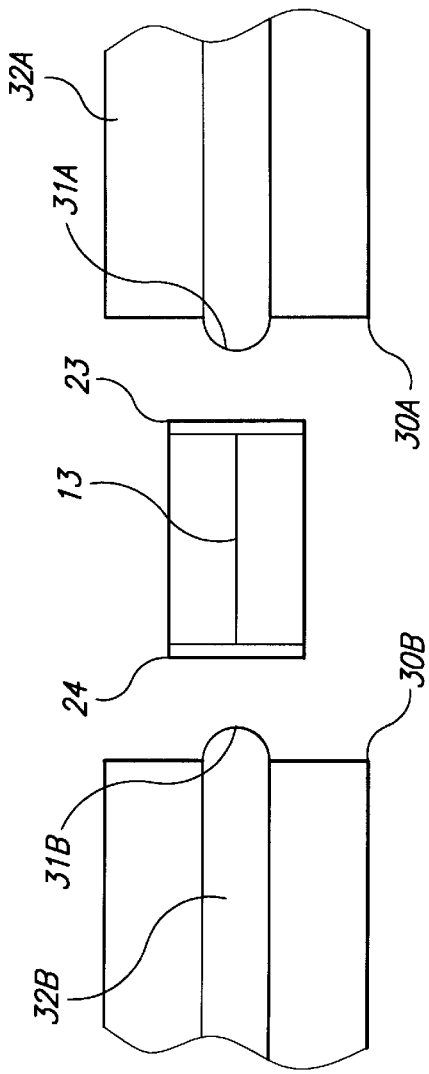
FIG. 3 shows the device of FIGS. 1 and 2 associated with glass fibre.

FIG. 3 shows a device as illustrated in FIGS. 1 and 2 located between two optical fibres 30A and 30B. Fibre 30A has a core with a lens 31A and a cladding 32A. Fibre 30A provides input to the device. Fibre 30B has a core with a lens 31B and a cladding 32B. Fibre 30B receives the output of the device. Rays are focused on the absorber region 13 so that they are modulated and transmitted to the output fibre 30B. The lens 31B focuses light from the device so that it is captured by the fibre 30B. There are air gaps between the two fibres 30A and 30B and the device and the anti-reflection coatings 23 and 24 are needed to reduce the amount of light which is reflected.

Figure 4:
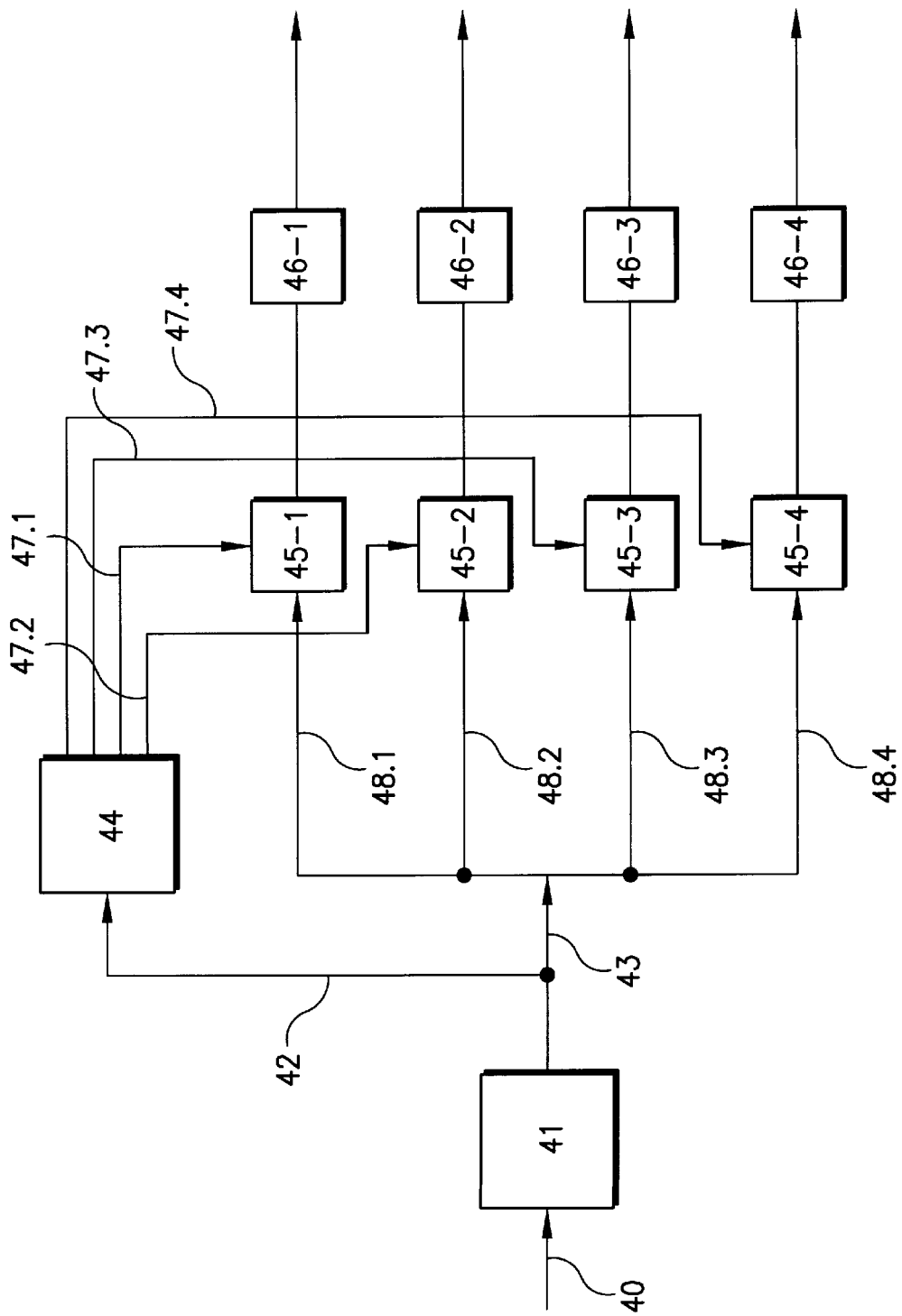
FIG. 4 illustrates an optical demodulator including the device.

FIG. 4 shows a demultiplexer for four channels in optical time division multiplex format. The demultiplexer comprises four EAM 45.1–45.4 each of which is as shown in FIGS. 1 and 2. Each of the EAM selects one of the channels and provides it to one of four optical detectors 46.1–46.4. The four EAM receive electrical control signals from controller 44. The demultiplexer also includes an erbium doped fibre amplifier (EDFA) 41. Each of the four channels operates at a rate of 10 Gbit/s so that the total bit rate is 40 Gbit/s. These signals are received on fibre 40 and amplified in the EDFA 41 to remove any attenuation which has occurred in transmission. About 10% of the signals are split onto fibre 42 and the remainder continue onto fibre 43. Fibre 42 is connected to the controller 44 to synchronise the control signals. Controller 44 produces 4 electrical control signals which are phased at 90° apart. And these are provided on connectors 47.1–47.4 to each of the EAM 45.1–45.4. The signals switch the EAM so that each passes its own channel and blocks the others. The incoming signals are divided into four equal parts on fibre 48.1–48.4 so that each of the EAM 45.1–45.4 receives the whole of the incoming signals. Each EAM 45.1–45.4 also receives electrical control signals on connectors 47.1–47.4 with the result that each of the detectors 46.1 46.4 receives only one of the channels whereby the output consists of the demultiplexed channels.

It is emphasised that the arrangement shown in FIG. 4 is conventional for demultiplexers and FIG. 4 illustrates that EAM according to the invention are suitable for use in a conventional optical arrangement. It is also apparent that integral EAM cannot be used in arrangements such as FIG. 4. Discrete EAM are necessary and this invention relates to discrete EAM.

Several devices as described above were prepared and the average modulation depth was 41 dB. Devices in which the electrical blocking region 12 was only 2500 nm thick had an average modulation depth of only 24 dB. In addition the thinner electrical blocking region was associated with interference effects during the "on" state.

While it is not intended to be bound by any explanation, it is believed that, using a mono-mode absorber region, EAM experience parasitic transmissions which by-pass the intended transmission path. These transmissions are not affected (or are little affected) by the state of the modulator, but with a large blocking region thickness the parasitic transmissions are not captured by the output fibre so the adverse effects are not produced. In the "off" state the parasitic light represents unwanted output. In the "on" state the parasitic light interferes with the intended transmission. In the case of integral EAM there is no practical problem of parasitic light because the laser and the EAM are closely integrated. Since both functions are included on the same chip they are grown in the processing sequence using common masks and the semiconductors have similar chemical compositions. Thus the alignments are very accurate and the problems of parasitic light do not arise.

We claim:

1. A discrete electroabsorption modulator for optical signals, which comprises an absorber region (13) in contact with an electrical blocking region (12) wherein whereby the absorber region (13) is adapted to guide optical signals along the length of the device, characterised in that the thickness of the electrical blocking region (12) is 3–20 μm and the thickness of the electrical blocking region (12) is 9–250 times the thickness of the absorber region (13).

2. A modulator according to claim 1, wherein the thickness of the electrical blocking region (12) is 10–50 times the thickness of the absorber region (13).

3. A modulator according to claim 2, wherein the thickness of the electrical blocking region (12) is 15–25 times the thickness of the absorber region (13).

4. A modulator according to claim 1, wherein the thickness of the electrical blocking region (12) is 4 to 6 µm.

5. A modulator according to claim 4, wherein the thickness of the electrical blocking region (12) is substantially 5 µm.

6. A modulator according to claim 1, wherein the absorber region (13) is a multi-quantum well structure.

7. A modulator according to claim 6, wherein the multi-quantum well structure (13) is formed of interleaved layers of two different semiconductor materials having two different band gaps.

8. A modulator according to claim 1, wherein the absorber region (13) is a single layer of a semiconductor having a uniform composition.

9. A modulator according to claim 1, wherein the electrical blocking region (12) comprises two separate portions (12a, 12b) and the absorber region (13) is located between and in contact with said portions (12a, 12b).

10. A modulator according to claim 9, which also comprises;

(A) a p-type region (14) which has an external contact (15), said p-type region (14) including a portion (17) which extends between and makes contact with the two portions (12a, 12b) of the electrical blocking region (12), said portion (17) also making contact with the absorber region (13), (B) a n-type region (10,11) makes contact with the absorber region (13) and which extends between and makes contact with the two portions (12a, 12b) of the electrical blocking region (12), whereby, the absorber region (13) is located between said p-type (14) and n-type (11) regions and the electrical blocking region (12) is also located between said p-type (14) and n-type (11) regions so as to concentrate electrical effects into the absorber region (13).

11. A modulator according to claim 10, wherein the p-type region (14), the n-type region (11), and the electrical blocking region (12) are all formed of suitably doped indium phosphide and the absorber region (13) is formed of one or two quaternary semiconductors of indium, gallium, phosphorus and arsenic; the band gap or gaps being provided by the ratios of the four elements.

12. A modulator according to claim 11, wherein the electrical blocking region (12) is formed of iron doped indium phosphide.

13. A modulator according to claim 1, wherein the absorber region (13) is less than 2 µm wide and less than 1 µm thick.

14. A modulator according to claim 13, wherein the absorber region (13) is 500–1000 nm wide and 100–500 nm thick.

15. A modulator according to claim 1, wherein the absorber region (13) is dimensioned to support only one principle transmission mode.

16. A modulator according to claim 1, wherein the absorber region (13) has a rear facet to receive optical signals for modulation and a front facet to provide modulated signals for transmission, wherein both of said facets have an anti-reflection coating (23, 24).

17. A electroabsorption modulator according to claim 1, wherein the modulation depth of the device is at least 40 dB.

18. An electroabsorption modulator according to claim 1, wherein the modulator is included in a device optically coupled to an input fibre (30a, 48) for the provision of signals to be switched, to an output fibre (30b) for the transmission of switched signals, and also wherein the modulator (45) is included in an electrical circuit (44) for the electrical control of the switching.

19. A method or modulating optical signals at bit rates in excess of 2 Gbit/s, which method comprises providing unmodulated signals to a discrete electroabsorption modulator (45) according to claim 1 and applying an electrical control signal (44) to the modulator to apply modulation to the signals.

20. A method of demultiplexing optical signals comprising a plurality of channels in time division multiplex format at a total bit rate in excess of 2 Gbit/s, which method comprises providing said optical signals to an electroabsorption modulator (45) according to claim 1 and applying an electrical control signal (44) to control the demultiplexing.

* * * * *